Patented July 16, 1935

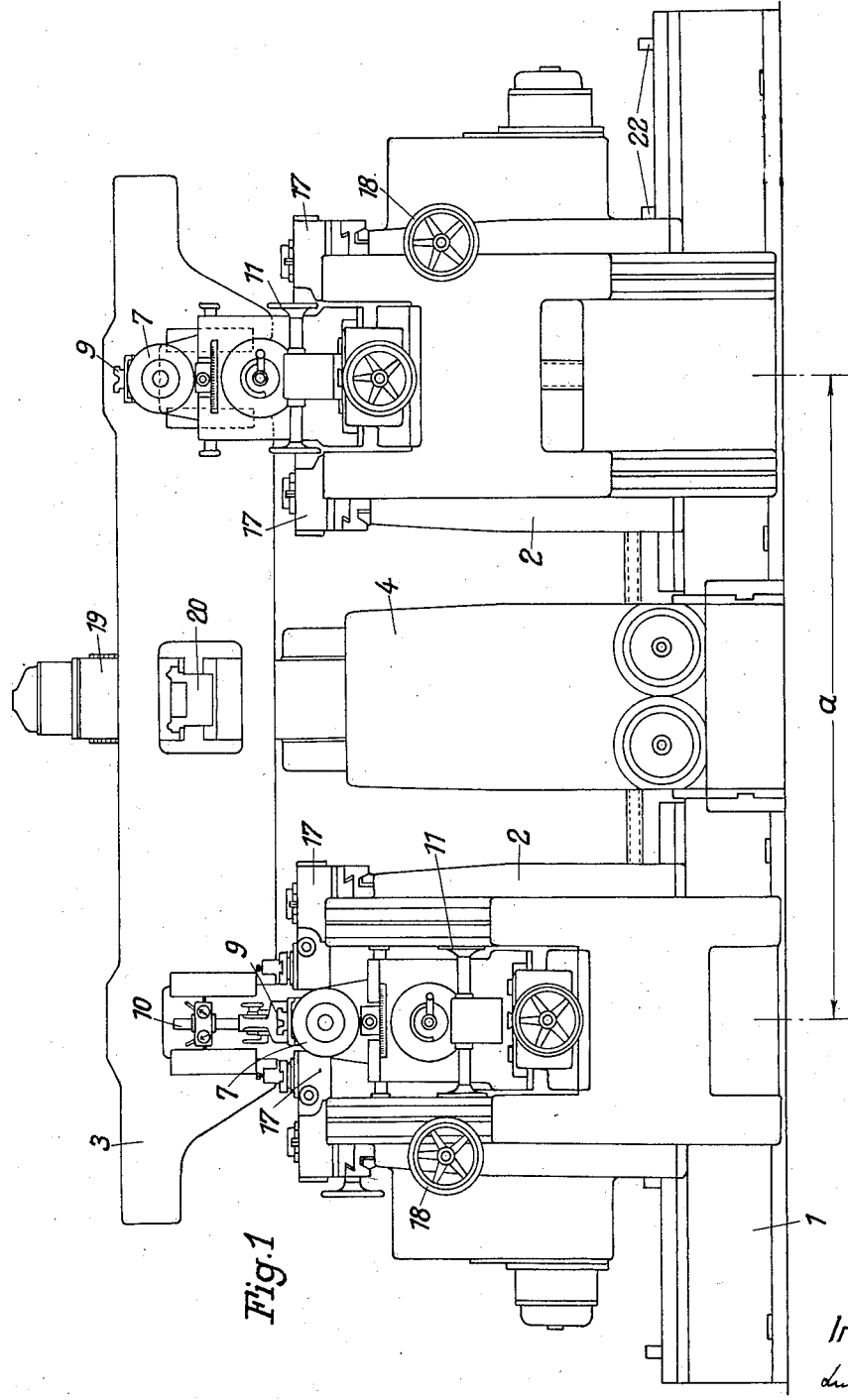

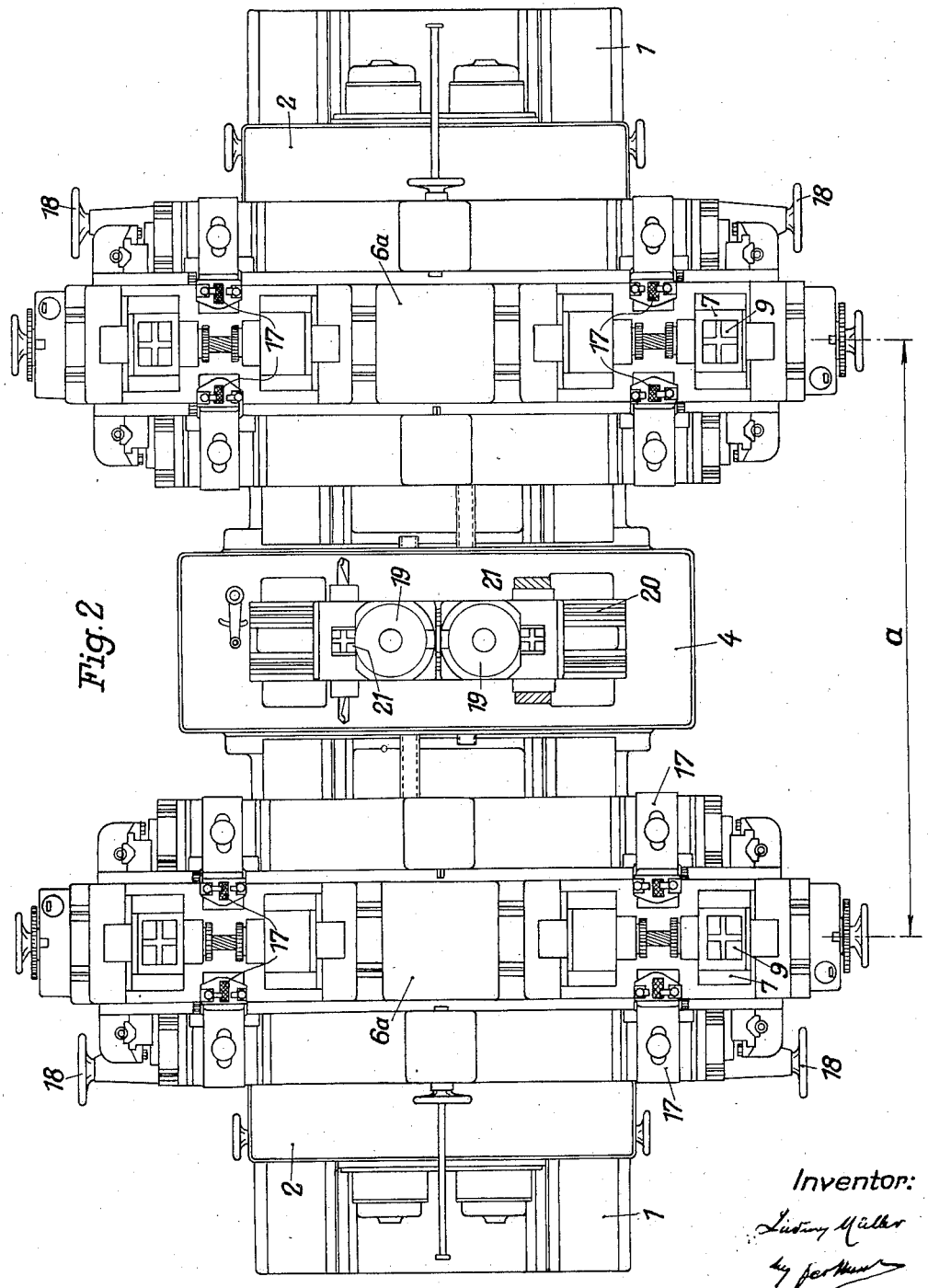

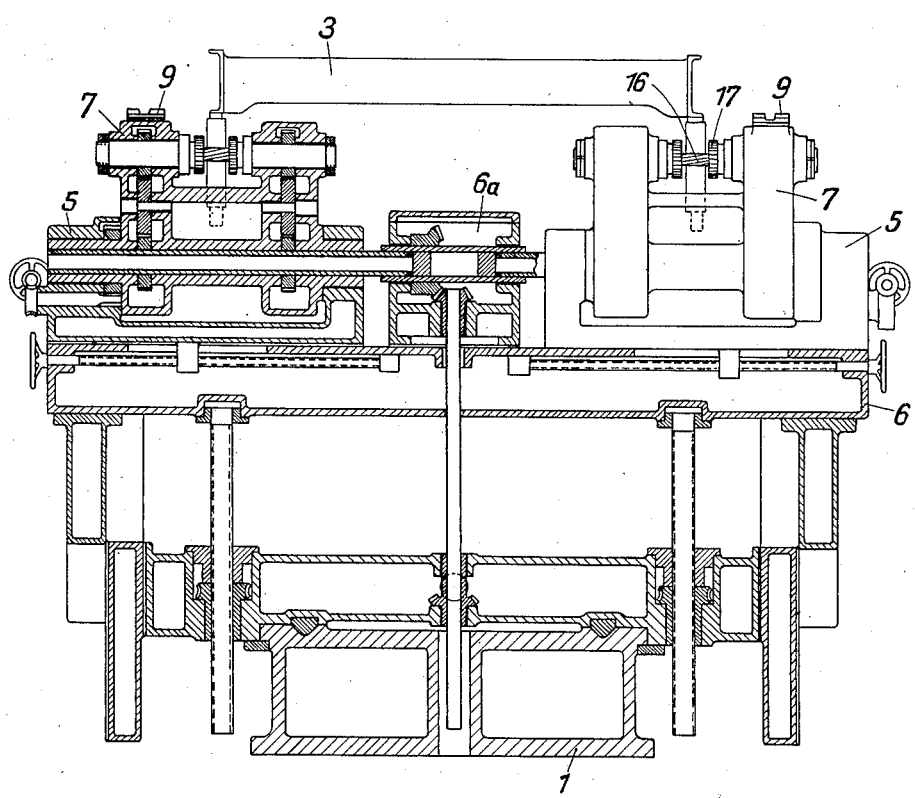

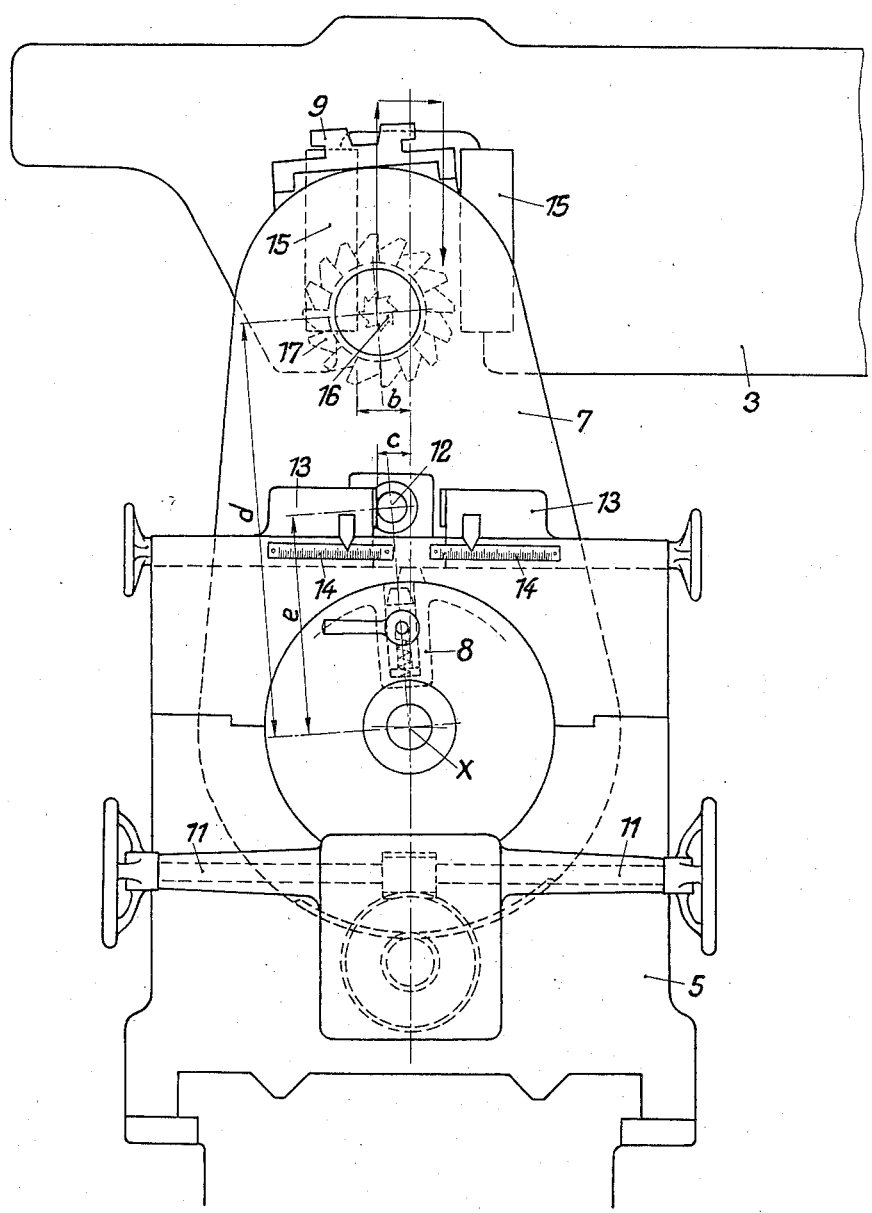

2,008,083

UNITED STATES PATENT OFFICE 2,008,083

MACHINE FOR MEASURING AND MACHINING FRAMES AND UNDERFRAMES OF VEHICLES, ESPECIALLY RAILWAY BOGIES

Ludwig Müller, Cologne, Germany

Application September 18, 1933, Serial No. 689,945
In Germany September 19, 1932

5 Claims. (Cl. 90—17)

The endeavours which have generally been made in recent times to increase in speed and running power vehicles, especially railway vehicles, have resulted in a more careful and accurate working, especially of the running mechanism of the vehicles both during the construction and subsequently during the maintenance with a view to ensuring safe running of the vehicles and on account of wear.

In order to attain this object precision machines must mostly be used for economical and technical reasons. Thus, for example, special bogie measuring and working machines are recently necessary for the construction and maintenance of railway bogies.

The invention relates to such a measuring and working machine for vehicle frames and underframes, especially for railway bogies, which will be hereinafter described.

The fundamental idea of the invention is, that the measuring and machining of vehicle underframes (bogies) must be carried out successively on one and the same machine without resetting of the vehicle underframe, the vehicle frame or underframe (bogie) no longer resting on a separate fixing table but directly on the machine, the latter being so constructed that it adjusts itself to the various wheel bases of the vehicle frames or underframes (bogies).

Moreover, the machine which is at the time a measuring stand, must be technically constructed so that the fixed points of the measuring stand required as starting points for the individual measurements are at the same time also the fixed and direction points for the adjustment of the machine tools for the machining to measurement.

An embodiment of the invention is illustrated by way of example in the accompanying drawings in which:—

Fig. 1 shows the machine in front elevation.

Fig. 2 is a top plan view of Fig. 1.

Fig. 3 shows the head of one of the lateral machine tools in side elevation partly in section.

Fig. 4 is a front elevation on a larger scale showing one of the head stocks of the machine tools.

Two different machine tools (milling machines) 2 are shiftably mounted on a machine bed 1 for the machining of the axle box guides of a bogie frame 3 which rests on the machines. A separate machine tool (milling machine) 4 is provided in the middle of the bed 1 between the two machine tools 2 for the machining of the swing bolster space of the bogie. The two machine tools 2 can be shifted by means of a separate drive from the middle of the bed 1 and then secured in position relative to the bed in such a manner that the distance $a$ between their centres accurately corresponds to the initial measurement of the wheel base of the bogie actually to be worked.

Two specially constructed head stocks 5 (Fig. 3) are arranged on a common transverse bed 6 in each of the two laterally shiftable machine tools 2, said transverse beds 6 being vertically shiftable in the machine tools 2. The head stocks 5 can be shifted on their transverse bed 6 in the longitudinal direction thereof. A branch drive 6$a$ is provided on each transverse bed 6 (Fig. 3) between the two head stocks 5 for transmitting the necessary power to the milling spindles of the two head stocks for working the guide cheeks 15 of the axle box guides.

As can be seen from Figs. 3 and 4, especially Fig. 4, bifurcated spindle heads 7 are mounted in the milling head stocks 5, oscillatable in the longitudinal direction of the machine bed 1. Separate holding devices 9 are provided on the spindle heads 7 which can be accurately fixed in vertical position relative to the head stocks 5 by index bolts 8 and on these devices 9 exchangeable measuring instruments 10 can be clamped absolutely centrally in longitudinal and transverse directions. The adjusting of the spindle heads 7 in the head stock 5 for the machining to measurement of the guide cheeks 15 on the bogie frame 3 is effected by swinging the spindle head 7 by means of a turning gear 11, gauge bolt 12, abutments 13 and measuring scales 14 in the following manner:—

First the diameter of the cylindrical cutter 16 is ascertained by means of a suitable measuring instrument 10, and a special gauge bolt 12, the diameter of which is correspondingly ground, is placed in the spindle head 7. The abutments 13 are thus alternately adjusted to the corresponding measurement $b$ on the scales 14, the index bolt 8 is loosened and the spindle head 7 is swung laterally by means of the turning gear 11 until the gauge bolt 12 bears against the abutment 13. The spindle head 7 is clamped in this position on the milling head stock 5. The scales 14 for the adjusting of the abutments 13 have lineal but not metric divisions.

The exchangeable gauge bolts 12 are of smaller diameter than the cylindrical cutters 16 because, during the turning of the spindle head 7 around the point X, the horizontal projection $c$ of the oscillating movement of the gauge bolt 12 to the horizontal projection $b$ of the oscillating movement of the cylindrical cutter 16 is proportional to the distance $e$ of the gauge bolt 12 from the centre "X" of the oscillation to the distance $d$ of the cylindrical cutter 16 from the centre "X". For clamping the bogie frame 3 on the machine tools 2, clamping devices 17 are provided (Figs. 1 and 2). By operating a clamping gear 18 these clamping devices 17, which are clamped unshiftable in the fundamental position on the machine tools 2, are loosened so that the bogie frames 3 can be shifted with the clamping devices 17 on rollers on the machine tools 2 in a horizontal plane longitudinally and transversely to the machine and adjusted to the measuring instruments 10. The milling machine 4 arranged stationary in the middle of the machine bed 1 for machining the swing bolster space, likewise has two milling heads 19 which can be shifted on a transverse bed 20 transversely to the longitudinal axis of the bogie, whereas the transverse bed 20 can only travel in vertical direction. Separate holding devices 21 are provided on the milling heads 19 of the swing bolster space milling machine 4 for carrying exchangeable measuring instruments.

The measuring and machining machine operates in the following manner:—

The two outer machine tools 2 (milling machines) are shifted on the machine bed 1 against the abutments 22, which are arranged at uniform distances from the middle of the machine bed 1, and then rigidly fixed relative to the machine bed 1. The abutments 22 are inserted into the machine bed 1 corresponding to the wheel base of the bogie, so that the distance $a$ between the centres of the shifted and fixed machine tools 2 corresponds to the original measurement of the wheel base of the bogie actually to be machined.

The bogie 3 is then placed on the clamping devices 17 by means of a crane and adjusted and clamped in vertical direction on the clamping devices. The clamping devices 17 are loosened by actuating the clamping gear 18 on the machine tools 2 and the bogie is adjusted in the horizontal plane longitudinally and transversely by shifting the bogie 3 by hand to the measuring instruments 10 on the machine. By actuating the clamping gears 18 in the opposite direction the clamping devices 17 are rigidly fixed with the bogie 3 relative to the machine tools 2. All parts of the bogie 3 are then measured by means of the exchangeable measuring instruments, for example 10, which are placed on the head stocks 5 and spindle heads 7.

The spindle heads 7 and milling heads 19 for machining to measurement the axle box guides and the swing bolster space are adjusted according to the measurements obtained by the measuring whereupon the measuring instruments are removed from the spindle heads 7 and milling heads 19. The drive of the machine is then started up and the bogie milled.

The machining of the axle box guides by means of the spindle heads 7 takes place in the direction of the arrow indicated in Fig. 4. When the machining has been finished, the spindle heads on the machine tools 2 and the milling heads 19 on the swing bolster space milling machine 4 are again lowered and, if necessary, the bogie 3 is measured again. When the bogie 3 has been detached from the clamping devices 17, it is lifted off the machine by means of a crane and the machine is made ready for the machining of the next following bogie with a different wheel base $a$ by shifting the two machine tools 2 on the machine bed 1.

For the mechanical machining of the vehicle under frames 3 on the machine other differently operating and suitably constructed machining devices may be employed instead of the devices 5, 7, 19, for example grinding, planing, shaping and other devices for mechanical machining.

I claim:—

1. A machine for machining frames and underframes of vehicles, especially for railway bogies with arrangement for measuring the points to be machined on the vehicle frame, comprising in combination a machine bed, at least two tool holders adapted to be adjusted on said bed and carrying the underframe of the vehicle, milling tools for machining the axle box guiding of the vehicle underframe, an oscillatable tool head in each tool holder in which said milling tools are accommodated, guide faces in the top end of said head and measuring instruments in said guides forming a unit with said machining tools during the measuring operation.

2. A machine for machining frames and underframes of vehicles, especially for railway bogies with arrangement for measuring the points to be machined on the vehicle frame, comprising in combination a machine bed, at least two tool holders adapted to be adjusted on said bed and carrying the underframe of the vehicle, milling tools for machining the axle box guiding of the vehicle underframe, an oscillatable tool head in each tool holder in which said milling tools are accommodated, adjustable abutments on said machine bed for limiting the adjusting of said shiftable tool holder with tools to the average measurement of the distance between the axles on the underframe of the vehicle, guide faces in the top end of said head, and measuring instruments in said guides forming a unit with said machining tools during the measuring operation.

3. A machine for machining frames and underframes of vehicles as specified in claim 2, comprising in combination with the tool holders, two oscillatable head stocks on each holder, a transverse bed in each tool holder between said head stocks, a bifurcated head stock in each spindle stock, said head stocks and bifurcated spindle heads serving for machining the faces of an axle bush guide, which faces are situated at either side of the middle axis, and index bolts for adjusting said head stocks and said bifurcated head stocks in the medial position.

4. Machine as specified in claim 1, comprising in combination with the machine tools, tool carriers pivotally mounted on said machine tools, gauge bolts of different diameters exchangeably inserted in said carriers, a device on said carriers adapted to insert said gauge bolts, abutments adjustable relative to said bolts, measuring scales adapted to indicate the position of said abutments, said gauge bolts exchangeable according to the wear of the tool and adapted to ensure the uniform distance of the surfaces to be machined from the central axis of the axle box guide.

5. Machine as specified in claim 1, comprising in combination a machine bed, an additional machine tool for machining the swing bolster space of the bogie frame mounted on said bed so that its centre coincides with the middle of the whole machine.

LUDWIG MÜLLER.